though that the time between injection and slaughter

2,942,982
METHOD OF TREATING FRESH MEAT

Charlton Lewis Wrenshall, Glen Cove, John Raymond McMahan, Freeport, and Robert Crittenden Ottke, Huntington Station, N.Y., assignors to Chas. Pfizer & Co., Inc., Brooklyn, N.Y., a corporation of Delaware No Drawing. Filed Nov. 2, 1956, Ser. No. 619,963

11 Claims. (Cl. 99—107)

This invention relates to the treatment of meat and has particular reference to a process for the preservation of fresh meat and to the products obtained by this process.

One of the principal objects of this invention is to provide a novel process for producing fresh (unfrozen) meats. Another object of this invention is to provide meat cuts which remain fresh for extremely long periods under above-freezing conditions. A further object of this invention is to provide meats having enhanced tenderness and flavor. Still another object of this invention is the preservation of fresh meat by a process which is quick, involving no long aging periods, and which is inexpensive when carried out on a quantity basis. Other objects and advantages of this invention will be readily apparent from the following detailed description of certain preferred embodiments thereof.

It is known that foods, such as meats, can be maintained in a fresh condition for reasonably long periods of time without refrigeration, by treatment with antibiotics. Such treatment has been effected by dipping the meat in brine, water or other conventional meat-processing solutions, which contain the antibiotic dissolved or suspended therein. Alternatively the meat may be sprayed with such a solution, or sprinkled with a dry antibiotic-containing powder, or packed in ice containing the antibiotic. A preferred method of contact has been post-mortem infusion of the carcass after slaughter, pumping a solution of the antibiotic through the vascular system under pressure.

A novel method has now been devised for contacting the meat with the antibiotic. This method provides a much more rapid and efficient way to distribute the preserving agent through the meat tissues, than any of the prior art methods. In its broader aspects this new process comprises intraperitoneally injecting a live animal with the antibiotic, shortly thereafter slaughtering the animal and aging the carcass, preferably at an elevated temperature.

It has been found that this ante-mortem injection of animals such as beef cattle, sheep, lambs and hogs, by the intraperitoneal route provides meat which remains in excellent condition and has fine flavor and texture when stored for as long as six weeks without refrigeration. Great extension of shelf life is obtained. Indeed, extensive tests have shown that the carcasses remain in substantially perfect condition even after two days at temperatures over 100° F. and at very high relative humidity, i.e. conditions which are frequently found in semi-tropical and tropical countries. Moreover, the intraperitoneal route of injection has been found to be much more practical and efficient than the intravenous route.

The time between the injection of the antibiotic and the slaughtering of the animal is critical in the sense that there should be sufficient time for the antibiotic to be thoroughly distributed throughout the animal, but insufficient time for the antibiotic to be eliminated from the body. Generally the intraperitoneal innoculation should be effected between one-half and twenty-four hours before slaughtering, while it is preferred to allow a time of only about one to four hours. It will be appreciated, however, that the time between injection and slaughter will vary with the particular antibiotic formulation selected, as well as its concentration and the quantity employed. The antibiotic may be employed simply in aqueous solution, or in physiological saline or any other injectable menstruum, in which it can be dissolved or suspended. The antibiotic may be used alone or coupled with other desired preservatives. For instance, an especially successful formulation, having most unexpected value in this process is a combination of a tetracycline antibiotic and a water-soluble hydroxylated organic acid, preferably aliphatic organic acids containing up to and including 8 carbon atoms. By water-soluble we mean acids which are soluble in water to the extent of at least 10 mg./ml. Examples of useful organic acids are citric, tartaric, gluconic and ascorbic. Of these, ascorbic acid-oxytetracycline formulations and citric acid-oxytetracycline formulations exhibit a surprising degree of absorption. To obtain a given level of antibiotic in the animal tissues, much less antibiotic is required when these organic acids are included in the injection. Generally the proportion of hydroxylated organic acid to antibiotic should range from about equal parts by weight to about 10 parts acid to one part antibiotic. Higher proportions of organic acid may be employed, but have little or no practical advantage. In the case of oxytetracycline and ascorbic acid, as well as oxytetracycline and citric acid, proportions of 1 part antibiotic to 3 parts organic acid have been found to be particularly effective.

Intraperitoneal injection is a simple technique which laymen employees of a slaughter house can readily learn. With cattle the animal is restrained in a chute and/or by a nose ring to prevent excessive movement. With sheep the animal may simply be held. The paralumbar fossa on the animal's right side (there is danger of injecting the antibiotic into the rumen on the left side; antibiotic absorption from the rumen is unsatisfactory) is the site of injection. Standard veterinary equipment may be used. The needle is directed inward and slightly downward near the middle of the fossa and inserted to the hub. In sheep and cattle the injection point is clearly outlined at the paralumbar fossa. In swine the area available for intraperitoneal injection is not so apparent. The injection site is on the right lateral surface approximately 3 inches dorsal to, and 3 inches anterior to the flank skin hold. The needle should be directed inward through the body wall and inserted to the hub. Swine weighing 200 pounds can be satisfactorily held by an Iowa Hog Holder during the injection.

Broad-spectrum antibiotics like oxytetracycline are preferred, because they are effective against many Gram-positive and Gram-negative bacteria, both aerobic and anaerobic, such as Salmonella, Micrococci and Clostridia. Oxytetracycline is fairly stable at low and room temperatures but decomposes with relative ease at temperatures used in cooking. The antibiotics may be used in any of their known, antibacterially active forms, such as the base or acid per se or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts. If desired, other antibiotics may be added, such as the acid form of penicillin or one of its metal salts; streptomycin or its salts, or its derivative, dihydrostreptomycin, and its salts. Generally the amount of antibiotic required in relation to the live weight of the meat is very small. For instance, from 0.5–10 mg. of oxytetracycline per pound is normally sufficient, while 2.0–6.0 mg. per pound is a preferred range. Similar proportions are utilized for the other tetracycline antibiotics.

In heat-aging the length of time at which the meat is held at the elevated temperature, and the degree of elevation of the temperature, are interdependent. Thus, generally the higher the temperature the shorter the time involved. However, it must be borne in mind that the temperature should not be so high as to involve cooking of the meat. "Heat-aging" is indeed a relative term, not generally connoting actual application of heat, but rather the absence of artificial cooling. For instance, in conventional meat-aging the carcass is usually held slightly above freezing, e.g. at 34° F., for a week to ten days. In the process of this invention, however, a temperature in the order of 50° to 120° F. may be employed, a preferred temperature range being substantially between 60° and 110° F. The meat need not be held at this temperature for more than from about one to four days. It has been found most desirable from the economic standpoint to employ ordinary room temperature or somewhat below, i.e. a temperature of about 55–80° F. for a period of about 1 to 2 days. Thus it is an important feature of this invention to effect more rapid aging than has heretofore been possible.

The carcasses are preferably refrigerated after aging, in order to facilitate cutting. In this step the temperature should not, of course, go below freezing for any appreciable period of time. Generally the meat is chilled to about 29° and 40° F. for ½ to 24 hours, although preferably it should be chilled between about 32° and 37° F.

Following are specific examples of this invention, but it is to be understood that they are given by way of illustration only and not in limitation of the invention.

*Example I*

Beef cattle, each weighing about 1,000 pounds, were passed in single file through a station wherein barriers were dropped in front of and behind them momentarily to prevent further movement. Each animal was injected in its right intraperitoneal cavity with oxytetracycline, half of the animals being given 3 grams oxytetracycline activity per animal and half, 6 grams per animal. The dosage formulation consisted of oxytetracycline as the hydrochloride dissolved in 100 ml. of water. The membrane and soft tissues of the intraperitoneal cavity rapidly absorbed the injected antibiotic and passed it into the blood stream, through which it was circulated to even the most minute tissues of the entire animal.

One hour after injection the animals were slaughtered. One untreated animal was also slaughtered to serve as a control. The carcasses were hung for two days under conditions of high relative humidity and at temperature of 80°–100° F. and allowed to age for two days. Exposed meat of both the control and treated quarters darkened appreciably at these high temperatures. The control developed a bad odor typical of putrefaction, and gas from deep-seated spoilage bacteria bubbled to the surface in many spots. The control also had areas which were slimy and a semiliquid fatty material dripped from other portions. In contrast to the control, all treated quarters had no evidence of gas and no putrefactive odor was apparent.

At the conclusion of dressing operations, samples of kidney, liver, and muscular tissue were removed and assayed. The results are shown in the following table.

| Oxytetracycline activity injected, Gm. | Oxytetracycline, μg./Gm. | | |
|---|---|---|---|
| | Kidney | Liver | Muscle |
| 6 | 16 | 18 | 0.53 |
| 3 | 11 | 16 | 0.78 |
| Control | | | |

*Example II*

Beef cattle were inoculated, some with 2 mg. of oxytetracycline per pound of live weight and some with 4 mg. of oxytetracycline per pound. The dosage form constituted 20 mg. of oxytetracycline per ml. of sterile distilled water. The animals were slaughtered two hours after injection and one untreated animal was slaughtered as a control. The carcasses were treated as in Example I and, after aging, were refrigerated at 36–38° F. for 24 hours prior to cutting. Lean meat samples taken 6 days after slaughter and again 6 weeks after slaughter indicated practically no decomposition of the antibiotic in the tissue, when held under refrigeration. The tissue levels in the animals injected with 2 mg. per pound were very nearly as high as those injected with 4 mg. per pound of antibiotic.

*Example III*

The procedure of each of Examples I and II was repeated, this time employing the antibiotic in combination with ascorbic acid in the relative proportion by weight of 1:19. In each instance these formulations gave tissue levels in the stored meat from two to three times those obtained in Examples I and II. At the end of eight weeks the meat refrigerated at 36–38° F. was perfectly fresh and had developed no deep spoilage or sours.

*Example IV*

One sheep was injected in the right intraperitoneal cavity with oxytetracycline in physiological saline. Another sheep was similarly injected with chlortetracycline. The dosage for each animal was 3 mg. antibiotic per pound of body weight. Two hours later the sheep were slaughtered, and the carcasses were aged for two days at 55–60° F. The carcasses were then chilled to about 34° F. and carved into the usual cuts for marketing.

Antibiotic levels in various organs and tissues were determined after slaughtering, as follows:

| Antibiotic | Muscle | Liver | Kidney | Heart | Spleen | Lung |
|---|---|---|---|---|---|---|
| Oxytetracycline | 1.6 | 25 | 25 | 3.7 | 4.3 | 4.2 |
| Chlortetracycline | 0.96 | 10 | 17 | 1.7 | 3.8 | 1.5 |

*Example V*

Eight lambs were injected and one lamb was used as a control. The paralumbar fossa on the animal's right side was the site of injection employed. A 3 inch needle, 16 gauge, was directed inward and slightly downward near the middle of the fossa and inserted to the hub. The syringe was attached and the calculated dose of antibiotic delivered. Injections were made at 23, 11, 4 and 2 hours before slaughter. All lambs were injected with 6 mg. of oxytetracycline activity per pound of body weight, the antibiotic being used as the hydrochloride salt.

Tissue samples were taken after slaughter and the oxytetracycline content was determined, using essentially the sensitive plate test of Randall et al. with a buffer pH of 5.6. Results were as follows, in mcg. per gm. of tissue.

| Hours | Heart | Chop | Leg | Kidney | Liver | Fat | Blood |
|---|---|---|---|---|---|---|---|
| 23 | 1.2 | 1.8 | 0.78 | 5.1 | 4.8 | 0.5 | 0.72 |
| 11 | 1.1 | 1.2 | 0.97 | 8.0 | 6.8 | 0.5 | 0.84 |
| 4 | 5.1 | 3.9 | 4.1 | | 41 | 1.2 | 7.5 |
| 2 | 6.8 | 7.6 | 6.0 | 65 | 90 | 2.4 | 7.0 |
| Control | [1] <0.25 | [1] 0.25 | [1] <0.25 | [1] <0.25 | [1] <0.25 | [1] <0.5 | [1] <0.25 |

[1] Below lowest detectable limit of test.

Intraperitoneal injection is a very rapid and easy way to get oxytetracycline into the tissues of lambs. The highest tissue level was obtained two hours after injection (the shortest time used in this experiment). It appears from the blood levels and from lean meat levels at later times that slaughter at any time from one to four hours after injection is satisfactory.

One half of each carcass was frozen and the other half hung in a room held at 80 to 85° F. The control animals began to give off strong odors after 48 hours, and by 72 hours the flesh had turned dark with a greenish cast. The treated animals had no evidence of gas or spoilage odor and the flesh remained bright in color. The flesh of the spoiling animals became soft and spongy while the other animals' flesh remained firm. Comparable results were obtained with tetracycline and chlortetracycline.

*Example VI*

Two hogs were injected intraperitoneally with 3 mg. per lb. oxytetracycline administered as the hydrochloride. One animal was slaughtered 1 hour after injection and the other, 2 hours. The injection was made through a 3½ inch, 16 gauge needle that was directed inward through the body wall and inserted to the hub. The antibiotic, dissolved in sterile distilled water, was ready in the syringe that was then attached, and the calcuated dose was delivered. The swine, which weighed approximately 200 pounds each, were satisfactorily held by an Iowa hog holder.

Following slaughter, one half of each carcass was hung at room temperature (80 to 100° F.). Other portions were submitted for oxytetracycline assay. Periodic observation of carcasses held at room temperature showed spoilage at 24 hours in two untreated control carcasses, as evidenced by development of a putrid odor and a greenish hue to the meat. By 48 hours gas bubbles were forming in the loose tissues. The rest of the animals remained in excellent condition for 48 to 72 hours.

| Animal | Oxytetracycline Levels in mcg./Gm., Swine | | | | | |
|---|---|---|---|---|---|---|
| | Heart | Muscle | Kidney | Liver | Fat | Blood |
| Control | <0.55 | <0.5 | <1.5 | <1.5 | <0.5 | <0.6 |
| Control | | <0.5 | <1.5 | <1.7 | <0.52 | <0.6 |
| Antibiotic 1 hour before slaughter | 4.3 | 3.0 | 37 | 41 | 0.94 | 4.1 |
| Antibiotic 2 hours before slaughter | 2.6 | 2.0 | 21 | 9.2 | 5.4 | 2.3 |

Oxytetracycline again had a retarding effect on the putrefactive changes in the tissues. The treatment is not only valuable for the preservation of fresh meat but reduces the deepseated bacterial load so that spoilage of treated meats such as hams can be reduced.

*Example VII*

Seven lambs weighing approximately 100 pounds each were selected for uniformity of breed, size, age and state of health. These lambs were then injected by the intraperitoneal route with oxytetracycline, both alone and in combination with various proportions of ascorbic acid and citric acid. The antibiotic and the antibiotic-organic acid compositions were dissolved in equal amounts (20 cc.) of sterile distilled water of neutral pH and injected immediately upon dissolution. Samples of jugular blood were withdrawn 30 minutes, 1, 2, 4 and 6 hours after injection, for the purpose of determining the blood sera levels of antibiotic obtained in each lamb. The results of these tests are set forth in the following table.

| Lamb No. | Oxytetracycline Given I/P, Mg. | Organic Acid Added to Oxytetracycline | Oxytetracycline: Acid Proportion (by wt.) | Oxytetracycline Sera Levels (mcg./ml.) at hours | | | | |
|---|---|---|---|---|---|---|---|---|
| | | | | ½ | 1 | 2 | 4 | 6 |
| 1 | 300 | None | 1:0 | 3.7 | 3.7 | 3.4 | 3.6 | 1.85 |
| 2 | 300 | Ascorbic, 300 mg | 1:1 | 3.24 | 4.16 | 4.04 | 3.96 | 3.4 |
| 3 | 300 | Ascorbic, 900 mg | 1:3 | 12.0 | 10.0 | 4.35 | 6.65 | 3.3 |
| 4 | 300 | Ascorbic, 2,700 mg | 1:9 | 8.7 | 8.3 | 7.0 | 4.16 | 3.1 |
| 5 | 300 | Citric, 300 mg | 1:1 | 4.1 | 4.1 | 3.8 | 3.6 | 3.2 |
| 6 | 300 | Citric, 900 mg | 1:3 | 10.0 | 8.24 | 7.1 | 3.6 | 3.16 |
| 7 | 300 | Citric, 2,700 mg | 1:9 | 10.0 | 9.6 | 7.24 | 3.52 | 2.5 |

What is claimed is:

1. A process for treating fresh meats which comprises intraperitoneally injecting a live animal with between about 0.5 and 10.0 mg. per pound of live weight of a broad-spectrum antibiotic, and within about ½ to 24 hours thereafter slaughtering the animal.

2. The process of claim 1 wherein the antibiotic is oxytetracycline.

3. The process of claim 1 wherein the antibiotic is chlortetracycline.

4. The process of claim 1 wherein the antibiotic is tetracycline.

5. A process for treating fresh meats which comprises intraperitoneally injecting a live animal with between about 0.5 and 10.0 mg. per pound of live weight of a tetracycline antibiotic, within about ½ to 24 hours thereafter slaughtering the animal, aging the carcass at a temperature between about 50° and 120° F. for from 1 to 4 days, then cooling the carcass to a temperature between about 29° and 40° F., and cutting the carcass into individual cuts.

6. A process for treating fresh meats which comprises intraperitoneally injecting a live animal with a mixture of an antibiotic and a water-soluble hydroxylated aliphatic organic acid containing up to 8 carbon atoms, in the proportions of between about 0.5 and 10.0 mg. of antibiotic and between about 0.5 and 100.0 mg. of acid per pound of live weight, within about ½ to 24 hours thereafter slaughtering the animal, and aging the carcass at a temperature between about 50° and 120° F. for approximately 1 to 4 days.

7. A process for treating fresh meats which comprises intraperitoneally injecting a live animal with a mixture of a tetracycline antibiotic and ascorbic acid in the proportions of between 0.5 and 10.0 mg. antibiotic per pound of live weight and between 0.5 and 100.0 mg. acid per pound of live weight, within about ½ to 24 hours thereafter slaughtering the animal, and aging the carcass at a temperature between about 50° and 120° F. for approximately 1 to 4 days.

8. The process of claim 7 wherein the antibiotic is oxytetracycline.

9. The process of claim 7 wherein the antibiotic is chlortetracycline.

10. The process of claim 7 wherein the antibiotic is tetracycline.

11. A process for treating fresh meats which comprises intraperitoneally injecting a live animal with a mixture of a tetracycline antibiotic and citric acid in the proportions of between 0.5 and 10.0 mg. antibiotic per pound of live weight and between 0.5 and 100.0 mg. acid per pound of live weight, within about ½ to 24 hours thereafter slaughtering the animal, and aging the carcass at a temperature between about 50° and 120° F. for approximately 1 to 4 days.

(References on following page)

References Cited in the file of this patent

UNITED STATES PATENTS

| | | |
|---|---|---|
| 2,786,768 | Deatherage | Mar. 26, 1957 |
| 2,798,812 | Savich et al. | July 9, 1957 |

OTHER REFERENCES

"Food Technology," December 1953, pages 495 to 499, inclusive, article entitled "Observation On Fresh Meat Processed By The Infusion Of Antibiotics," by H. H. Weiser et al.

"Food Technology," July 1954, page 320, article entitled "Smoke Flavor And Ascorbic Acid As Preservatives For Fatty Fish," by Marie Erdman et al.

"The Journal Of The American Medical Association," Mar. 3, 1956, pages 779 and 780, article entitled "Chlortetracycline, A Food Preservative."